Figure 2:
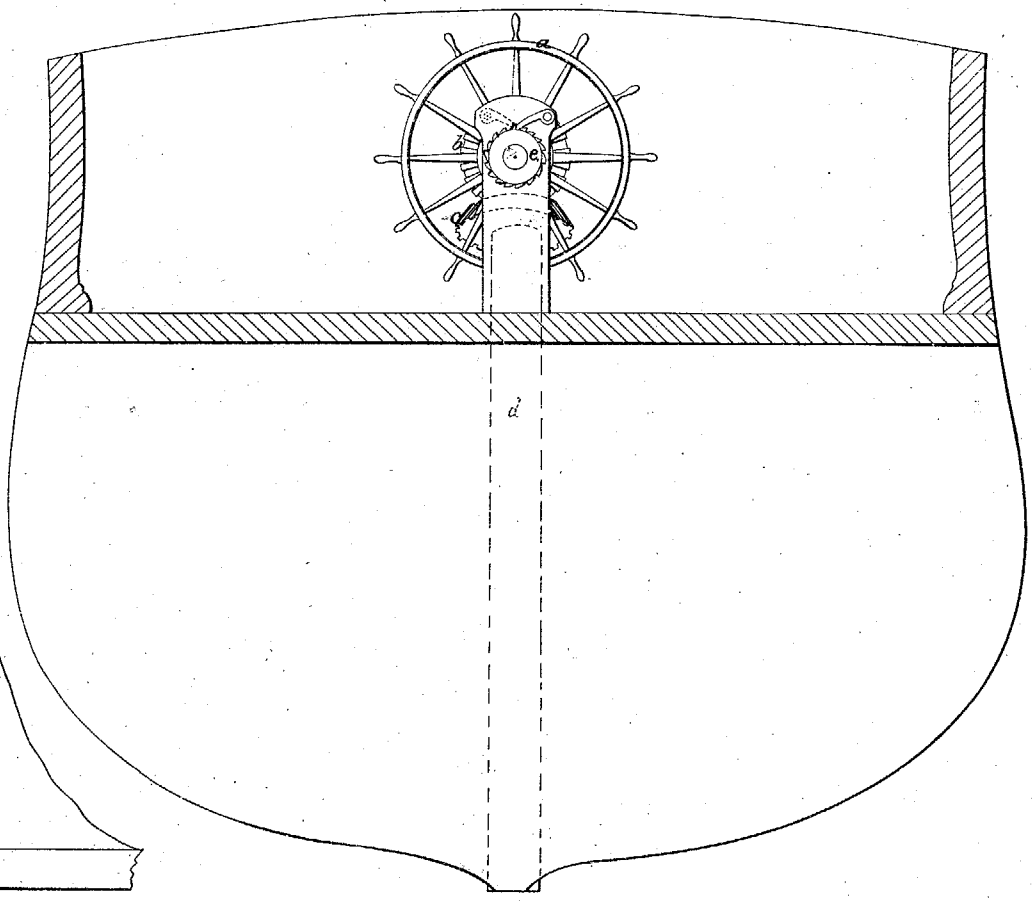
Figure 1:
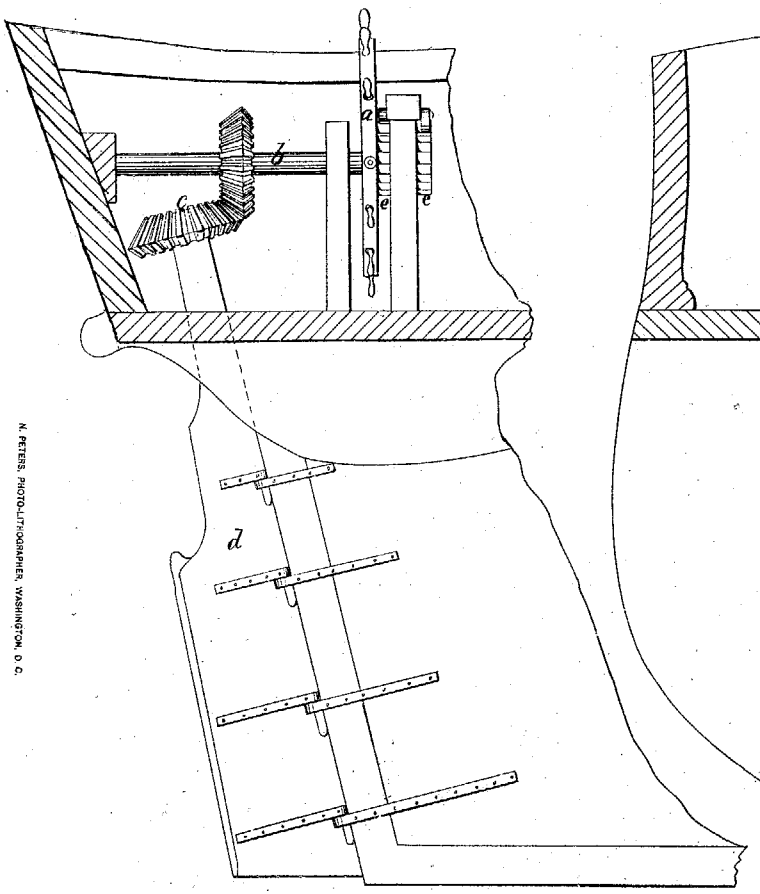

1375X

Phillips & Smallman
Steering.

Patented Sept. 18, 1810.

N. PETERS, PHOTO-LITHOGRAPHER, WASHINGTON, D. C.

The United States of America

1375X

To all to whom these Letters Patent Shall Come,

Whereas John Phillips and James Smallman Citizens of the United
States have alleged that they have invented a new and useful improvement in Steering
Vessels, which improvement they state has not been known or used before their applicati
have made oath that they do verily believe that they are the true inventors or discover
of the said improvement, have paid into the Treasury of the United States, the sum of
thirty dollars delivered a receipt for the same and presented a petition to the Secreta
of State, signifying a desire of obtaining an exclusive property in the said improvement
and praying that a patent may be granted for that purpose: These are therefore to Gra
according to Law, to the John Phillips and James Smallman their heirs administrator
assigns, for the term of fourteen years from the eighteenth day of September 1810, the fu
and exclusive Right and Liberty of making, constructing, using and vending to othe
to be used, the said improvement a description whereof is given in the words of the sa
John Phillips and James Smallman themselves, in the Schedule hereto annexed & is
made a part of these presents.

Seal of the United States

In Testimony whereof I have caused these Letters to be made Pat
and the Seal of the United States to be hereunto affixed.
Given under my hand at the City of Washington this eighteenth
day of September in the year of our Lord one thousand eight hun
dred & ten & of the Independence of the United States of Americ
the thirty fifth.

James Madison
By the President
R. Smith
Secretary of State

City of Washington, to wit.

I do hereby Certify that the foregoing Letters Patent were delivered to me on the eighte
day of September in the year of our Lord one thousand eight hundred and ten, to be examined
that I have examined the same & find them conformable to Law, & I do hereby return the same
to the Secretary of State within fifteen days from the date aforesaid, to wit, on this eighteenth
of September in the year aforesaid.

C. A. Rodney
Attorney General of the United Sta (380 words.)

The Schedule referred to in these Letters Patent & making part of the same, containing
description in the words of the said John Phillips and James Smallman themselves of the A wooden frame is contrunded close aft on the Spar or Gun Deck, upon it is [illegible]
a perpendicular wheel, with handles as in common use. The wheel moves an axis on the [illegible]
of which is a pinion, moving either in a bevil, horizontal, or spur sector, fixed on the ru[illegible]
head (the draft is a bevil) this moves the rudder Starboard & Larboard_

The whole has a ratchet to receive the palls, should the helmsman have occasion [illegible]
minute to leave his post, and the helm will keep steady.

The principle upon which the endless screw acts, is the same, as that described in
the foregoing application, and therefore the inventors of this machine claim it to be
included therein_

Witnesses /
Joseph W. Williams
George Hedderly

John Phillips
James Smallman (170 words)

Drawing mad [illegible] [illegible] -1841.